(12) United States Patent
Melanson (10) Patent No.: US 8,179,110 B2
(45) Date of Patent: May 15, 2012

(54) ADJUSTABLE CONSTANT CURRENT SOURCE WITH CONTINUOUS CONDUCTION MODE ("CCM") AND DISCONTINUOUS CONDUCTION MODE ("DCM") OPERATION

(75) Inventor: John Laurence Melanson, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 897 days.

(21) Appl. No.: 12/242,009

(22) Filed: Sep. 30, 2008

(65) Prior Publication Data

US 2010/0079124 A1 Apr. 1, 2010

(51) Int. Cl.
*G05F 1/40* (2006.01)
(52) U.S. Cl. ........................................ 323/282
(58) Field of Classification Search .................. 323/265, 323/266, 273, 274, 282–284; 315/224, 247, 315/291
See application file for complete search history.

(56) References Cited

U.S. PATENT DOCUMENTS

| | | |
|---|---|---|
| 3,316,495 A | 4/1967 | Sherer |
| 3,423,689 A | 1/1969 | Miller et al. |
| 3,586,988 A | 6/1971 | Weekes |
| 3,725,804 A | 4/1973 | Langan |
| 3,790,878 A | 2/1974 | Brokaw |
| 3,881,167 A | 4/1975 | Pelton et al. |
| 4,075,701 A | 2/1978 | Hofmann |
| 4,334,250 A | 6/1982 | Theus |
| 4,414,493 A | 11/1983 | Henrich |
| 4,476,706 A | 10/1984 | Hadden et al. |
| 4,677,366 A | 6/1987 | Wilkinson et al. |
| 4,683,529 A | 7/1987 | Bucher |
| 4,700,188 A | 10/1987 | James |
| 4,737,658 A | 4/1988 | Kronmuller et al. |
| 4,797,633 A | 1/1989 | Humphrey |
| 4,937,728 A | 6/1990 | Leonardi |
| 4,940,929 A | 7/1990 | Williams |
| 4,973,919 A | 11/1990 | Allfather |
| 4,979,087 A | 12/1990 | Sellwood et al. |

(Continued)

FOREIGN PATENT DOCUMENTS

EP 0585789 A1 3/1994

(Continued)

OTHER PUBLICATIONS

Linear Technology, "Single Switch PWM Controller with Auxiliary Boost Converter," LT1950 Datasheet, Linear Technology, Inc. Milpitas, CA, 2003.

(Continued)

*Primary Examiner* — Adolf Berhane
(74) *Attorney, Agent, or Firm* — Steven Lin, Esq.

(57) ABSTRACT

A converter system and method of operating a converter system are disclosed. The converter system comprises a converter power stage that can operate in a Discontinuous Conduction Mode (DCM) in a range of output currents and a Continuous Conduction Mode (CCM) in another range of output currents. The converter power stage includes at least an inductor with an inductor value and a control switch. The converter power stage provides an average current. A current controller is coupled to the converter power stage. When the converter power stage operates in DCM, the converter power stage provides the average current and the current controller is configured to measure the inductor value of the inductor. Furthermore, the current controller can also be configured to measure an input-to-output conversion ratio from the converter power stage.

24 Claims, 7 Drawing Sheets

U.S. PATENT DOCUMENTS

| | | |
|---|---|---|
| 4,980,898 A | 12/1990 | Silvian |
| 4,992,919 A | 2/1991 | Lee et al. |
| 4,994,952 A | 2/1991 | Silva et al. |
| 5,001,620 A | 3/1991 | Smith |
| 5,109,185 A | 4/1992 | Ball |
| 5,121,079 A | 6/1992 | Dargatz |
| 5,206,540 A | 4/1993 | de Sa e Silva et al. |
| 5,264,780 A | 11/1993 | Bruer et al. |
| 5,278,490 A | 1/1994 | Smedley |
| 5,323,157 A | 6/1994 | Ledzius et al. |
| 5,359,180 A | 10/1994 | Park et al. |
| 5,383,109 A | 1/1995 | Maksimovic et al. |
| 5,424,932 A | 6/1995 | Inou et al. |
| 5,477,481 A | 12/1995 | Kerth |
| 5,479,333 A | 12/1995 | McCambridge et al. |
| 5,481,178 A | 1/1996 | Wilcox et al. |
| 5,565,761 A | 10/1996 | Hwang |
| 5,589,759 A | 12/1996 | Borgato et al. |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,781,040 A | 7/1998 | Myers |
| 5,783,909 A | 7/1998 | Hochstein |
| 5,798,635 A | 8/1998 | Hwang et al. |
| 5,900,683 A | 5/1999 | Rinehart et al. |
| 5,929,400 A | 7/1999 | Colby et al. |
| 5,946,202 A | 8/1999 | Balogh |
| 5,946,206 A | 8/1999 | Shimizu et al. |
| 5,952,849 A | 9/1999 | Haigh et al. |
| 5,960,207 A | 9/1999 | Brown |
| 5,963,086 A | 10/1999 | Hall |
| 5,966,297 A | 10/1999 | Minegishi |
| 5,994,885 A | 11/1999 | Wilcox et al. |
| 6,016,038 A | 1/2000 | Mueller et al. |
| 6,043,633 A | 3/2000 | Lev et al. |
| 6,072,969 A | 6/2000 | Yokomori et al. |
| 6,083,276 A | 7/2000 | Davidson et al. |
| 6,084,450 A | 7/2000 | Smith et al. |
| 6,150,774 A | 11/2000 | Mueller et al. |
| 6,181,114 B1 | 1/2001 | Hemena et al. |
| 6,211,626 B1 | 4/2001 | Lys et al. |
| 6,211,627 B1 | 4/2001 | Callahan |
| 6,229,271 B1 | 5/2001 | Liu |
| 6,229,292 B1 | 5/2001 | Redl et al. |
| 6,246,183 B1 | 6/2001 | Buonavita |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,344,811 B1 | 2/2002 | Melanson |
| 6,385,063 B1 | 5/2002 | Sadek et al. |
| 6,407,691 B1 | 6/2002 | Yu |
| 6,441,558 B1 | 8/2002 | Muthu et al. |
| 6,445,600 B2 | 9/2002 | Ben-Yaakov |
| 6,452,521 B1 | 9/2002 | Wang |
| 6,469,484 B2 | 10/2002 | L'Hermite et al. |
| 6,495,964 B1 | 12/2002 | Muthu et al. |
| 6,509,913 B2 | 1/2003 | Martin, Jr. et al. |
| 6,580,258 B2 | 6/2003 | Wilcox et al. |
| 6,583,550 B2 | 6/2003 | Iwasa et al. |
| 6,628,106 B1 | 9/2003 | Batarseh et al. |
| 6,636,003 B2 | 10/2003 | Rahm et al. |
| 6,646,848 B2 | 11/2003 | Yoshida et al. |
| 6,688,753 B2 | 2/2004 | Calon et al. |
| 6,713,974 B2 | 3/2004 | Patchornik et al. |
| 6,724,174 B1 | 4/2004 | Esteves et al. |
| 6,727,832 B1 | 4/2004 | Melanson |
| 6,737,845 B2 | 5/2004 | Hwang |
| 6,741,123 B1 | 5/2004 | Anderson et al. |
| 6,753,661 B2 | 6/2004 | Muthu et al. |
| 6,756,772 B2 | 6/2004 | McGinnis |
| 6,768,655 B1 | 7/2004 | Yang et al. |
| 6,781,351 B2 | 8/2004 | Mednik et al. |
| 6,788,011 B2 | 9/2004 | Mueller et al. |
| 6,806,659 B1 | 10/2004 | Mueller et al. |
| 6,839,247 B1 | 1/2005 | Yang |
| 6,860,628 B2 | 3/2005 | Robertson et al. |
| 6,870,325 B2 | 3/2005 | Bushell et al. |
| 6,873,065 B2 | 3/2005 | Haigh et al. |
| 6,882,552 B2 | 4/2005 | Telefus et al. |
| 6,888,322 B2 | 5/2005 | Dowling et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shytenberg et al. |
| 6,956,750 B1 | 10/2005 | Eason et al. |
| 6,958,920 B2 | 10/2005 | Mednik et al. |
| 6,963,496 B2 | 11/2005 | Bimbaud |
| 6,967,448 B2 | 11/2005 | Morgan et al. |
| 6,970,503 B1 | 11/2005 | Kalb |
| 6,975,079 B2 | 12/2005 | Lys et al. |
| 6,975,523 B2 | 12/2005 | Kim et al. |
| 6,980,446 B2 | 12/2005 | Simada et al. |
| 7,003,023 B2 | 2/2006 | Krone et al. |
| 7,034,611 B2 | 4/2006 | Oswal et al. |
| 7,050,509 B2 | 5/2006 | Krone et al. |
| 7,064,498 B2 | 6/2006 | Dowling et al. |
| 7,064,531 B1 | 6/2006 | Zinn |
| 7,075,329 B2 | 7/2006 | Chen et al. |
| 7,078,963 B1 | 7/2006 | Andersen et al. |
| 7,088,059 B2 | 8/2006 | McKinney et al. |
| 7,102,902 B1 | 9/2006 | Brown et al. |
| 7,106,603 B1 | 9/2006 | Lin et al. |
| 7,109,791 B1 | 9/2006 | Epperson et al. |
| 7,126,288 B2 | 10/2006 | Ribarich et al. |
| 7,135,824 B2 | 11/2006 | Lys et al. |
| 7,145,295 B1 | 12/2006 | Lee et al. |
| 7,158,633 B1 | 1/2007 | Hein |
| 7,161,816 B2 | 1/2007 | Shytenberg et al. |
| 7,183,957 B1 | 2/2007 | Melanson |
| 7,221,130 B2 | 5/2007 | Ribeiro et al. |
| 7,233,135 B2 | 6/2007 | Noma et al. |
| 7,246,919 B2 | 7/2007 | Porchia et al. |
| 7,255,457 B2 | 8/2007 | Ducharm et al. |
| 7,266,001 B1 | 9/2007 | Notohamiprodjo et al. |
| 7,288,902 B1 | 10/2007 | Melanson |
| 7,292,013 B1 | 11/2007 | Chen et al. |
| 7,310,244 B2 | 12/2007 | Yang et al. |
| 7,317,305 B1* | 1/2008 | Stratakos et al. ............. 323/282 |
| 7,323,828 B2* | 1/2008 | Russell et al. ................ 315/291 |
| 7,345,458 B2 | 3/2008 | Kanai et al. |
| 7,375,476 B2 | 5/2008 | Walter et al. |
| 7,388,764 B2 | 6/2008 | Huynh et al. |
| 7,394,210 B2 | 7/2008 | Ashdown |
| 7,511,437 B2 | 3/2009 | Lys et al. |
| 7,518,350 B2* | 4/2009 | Leung ........................... 323/283 |
| 7,538,499 B2 | 5/2009 | Ashdown |
| 7,545,130 B2 | 6/2009 | Latham |
| 7,554,473 B2 | 6/2009 | Melanson |
| 7,569,996 B2 | 8/2009 | Holmes et al. |
| 7,583,136 B2 | 9/2009 | Pelly |
| 7,652,459 B2* | 1/2010 | Abu Qahouq et al. ........ 323/283 |
| 7,656,103 B2 | 2/2010 | Shteynberg et al. |
| 7,710,047 B2 | 5/2010 | Shteynberg et al. |
| 7,719,248 B1 | 5/2010 | Melanson |
| 7,746,043 B2 | 6/2010 | Melanson |
| 7,746,671 B2 | 6/2010 | Radecker et al. |
| 7,750,738 B2 | 7/2010 | Bach |
| 7,759,881 B1* | 7/2010 | Melanson .................... 315/307 |
| 7,804,256 B2 | 9/2010 | Melanson |
| 7,855,864 B2* | 12/2010 | Andruzzi et al. ............. 361/91.1 |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0174520 A1 | 9/2003 | Bimbaud |
| 2003/0223255 A1 | 12/2003 | Ben-Yaakov |
| 2004/0004465 A1 | 1/2004 | McGinnis |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yancie et al. |
| 2004/0227571 A1 | 11/2004 | Kuribayashi |
| 2004/0228116 A1 | 11/2004 | Miller et al. |

| | | | |
|---|---|---|---|
| 2004/0232971 A1 | 11/2004 | Kawasake et al. | |
| 2004/0239262 A1 | 12/2004 | Ido et al. | |
| 2005/0057237 A1 | 3/2005 | Clavel | |
| 2005/0156770 A1 | 7/2005 | Melanson | |
| 2005/0168492 A1 | 8/2005 | Hekstra et al. | |
| 2005/0184895 A1 | 8/2005 | Petersen et al. | |
| 2005/0207190 A1 | 9/2005 | Gritter | |
| 2005/0218838 A1 | 10/2005 | Lys | |
| 2005/0253533 A1 | 11/2005 | Lys et al. | |
| 2005/0270813 A1 | 12/2005 | Zhang et al. | |
| 2005/0275354 A1 | 12/2005 | Hausman, Jr. et al. | |
| 2005/0275386 A1 | 12/2005 | Jepsen et al. | |
| 2006/0022916 A1 | 2/2006 | Aiello | |
| 2006/0023002 A1 | 2/2006 | Hara et al. | |
| 2006/0125420 A1 | 6/2006 | Boone et al. | |
| 2006/0214603 A1 | 9/2006 | Oh et al. | |
| 2006/0226795 A1 | 10/2006 | Walter et al. | |
| 2006/0238136 A1 | 10/2006 | Johnson, III et al. | |
| 2006/0261754 A1 | 11/2006 | Lee | |
| 2006/0285365 A1 | 12/2006 | Huynh et al. | |
| 2007/0024213 A1 | 2/2007 | Shteynberg et al. | |
| 2007/0029946 A1 | 2/2007 | Yu et al. | |
| 2007/0040512 A1 | 2/2007 | Jungwirth et al. | |
| 2007/0053182 A1 | 3/2007 | Robertson | |
| 2007/0103949 A1 | 5/2007 | Tsuruya | |
| 2007/0124615 A1 | 5/2007 | Orr | |
| 2007/0182699 A1 | 8/2007 | Ha et al. | |
| 2008/0012502 A1 | 1/2008 | Lys | |
| 2008/0043504 A1 | 2/2008 | Ye et al. | |
| 2008/0054815 A1 | 3/2008 | Kotikalapoodi et al. | |
| 2008/0130322 A1 | 6/2008 | Artusi et al. | |
| 2008/0174291 A1 | 7/2008 | Hansson et al. | |
| 2008/0174372 A1 | 7/2008 | Tucker et al. | |
| 2008/0175029 A1 | 7/2008 | Jung et al. | |
| 2008/0192509 A1 | 8/2008 | Dhuyvetter et al. | |
| 2008/0224635 A1 | 9/2008 | Hayes | |
| 2008/0232141 A1 | 9/2008 | Artusi et al. | |
| 2008/0239764 A1 | 10/2008 | Jacques et al. | |
| 2008/0259655 A1 | 10/2008 | Wei et al. | |
| 2008/0278132 A1 | 11/2008 | Kesterson et al. | |
| 2009/0067204 A1 | 3/2009 | Ye et al. | |
| 2009/0147544 A1 | 6/2009 | Melanson | |
| 2009/0174479 A1 | 7/2009 | Yan et al. | |
| 2009/0218960 A1 | 9/2009 | Lyons et al. | |

FOREIGN PATENT DOCUMENTS

| | | | |
|---|---|---|---|
| EP | 0910168 A1 | 4/1999 | |
| EP | 1014563 | 6/2000 | |
| EP | 1164819 A | 12/2001 | |
| EP | 1213823 A2 | 6/2002 | |
| EP | 1528785 A | 5/2005 | |
| EP | 2204905 A1 | 7/2010 | |
| GB | 2069269 A | 8/1981 | |
| WO | 01/15316 A1 | 1/2001 | |
| WO | 01/97384 A | 12/2001 | |
| WO | 02/15386 A2 | 2/2002 | |
| WO | WO0227944 | 4/2002 | |
| WO | 02/091805 A2 | 11/2002 | |
| WO | WO 2006/022107 A2 | 3/2006 | |
| WO | 2006/067521 A | 6/2006 | |
| WO | WO2006135584 | 12/2006 | |
| WO | 2007/026170 A | 3/2007 | |
| WO | 2007/079362 A | 7/2007 | |
| WO | WO 2007141741 A1 * | 12/2007 | |

OTHER PUBLICATIONS

Yu, Zhenyu, 3.3V DSP for Digital Motor Control, Texas Instruments, Application Report SPRA550 dated Jun. 1999.

International Rectifier, Data Sheet No. PD60143-O, Current Sensing Single Channel Driver, El Segundo, CA, dated Sep. 8, 2004.

Balogh, Laszlo, "Design and Application Guide for High Speed MOSFET Gate Drive Circuits" [Online] 2001, Texas Instruments, Inc., SEM-1400, Unitrode Power Supply Design Seminar, Topic II, TI literature No. SLUP133, XP002552367, Retrieved from the Internet: URL:htt//://focus.ti.com/lit/ml/slup169/slup169.pdf the whole document.

Mamano, Bob, "Current Sensing Solutions for Power Supply Designers", Unitrode Seminar Notes SEM1200, 1999.

http://toolbarpdf.com/docs/functions-and-features-of-inverters.html printed on Jan. 20, 2011.

ST Datasheet L6562, Transition-Mode PFC Controller, 2005, STMicroelectronics, Geneva, Switzerland.

Maksimovic, Regan Zane and Robert Erickson, Impact of Digital Control in Power Electronics, Proceedings of 2004 International Symposium on Power Semiconductor Devices & Ics, Kitakyushu, , Apr. 5, 2010, Colorado Power Electronics Center, ECE Department, University of Colorado, Boulder, CO.

Texas Instruments, Interleaving Continuous Conduction Mode PFC Controller, UCC28070, SLUS794C, Nov. 2007, revised Jun. 2009, Texas Instruments, Dallas TX.

Infineon, CCM-PFC Standalone Power Factor Correction (PFC) Controller in Continuous Conduction Mode (CCM), Version 2.1, Feb. 6, 2007.

International Rectifier, IRAC1150-300W Demo Board, User's Guide, Rev 3.0, Aug. 2, 2005.

International Rectifier, Application Note AN-1077,PFC Converter Design with IR1150 One Cycle Control IC, rev. 2.3, Jun. 2005.

International Rectifier, Data Sheet PD60230 revC, Feb. 5, 2007.

Lu et al., International Rectifier, Bridgeless PFC Implementation Using One Cycle Control Technique, 2005.

Linear Technology, LT1248, Power Factor Controller, Apr. 20, 2007.

ON Semiconductor, AND8123/D, Power Factor Correction Stages Operating in Critical Conduction Mode, Sep. 2003.

ON Semiconductor, MC33260, GreenLine Compact Power Factor Controller: Innovative Circuit for Cost Effective Solutions, Sep. 2005.

ON Semiconductor, NCP1605, Enhanced, High Voltage and Efficient Standby Mode, Power Factor Controller, Feb. 2007.

ON Semconductor, NCP1606, Cost Effective Power Factor Controller, Mar. 2007.

ON Semiconductor, NCP1654, Product Review, Power Factor Controller for Compact and Robust, Continuous Conduction Mode Pre-Converters, Mar. 2007.

Philips, Application Note, 90W Resonant SMPS with TEA1610 SwingChip, AN99011, 1999.

NXP, TEA1750, GreenChip III SMPS control IC Product Data Sheet, Apr. 6, 2007.

Renesas, HA16174P/FP, Power Factor Correction Controller IC, Jan. 6, 2006.

Renesas Technology Releases Industry's First Critical-Conduction-Mode Power Factor Correction Control IC Implementing Interleaved Operation, Dec. 18, 2006.

Renesas, Application Note R2A20111 EVB, PFC Control IC R2A20111 Evaluation Board, Feb. 2007.

STMicroelectronics, L6563, Advanced Transition-Mode PFC Controller, Mar. 2007.

Texas Instruments, Application Note SLUA321, Startup Current Transient of the Leading Edge Triggered PFC Controllers, Jul. 2004.

Texas Instruments, Application Report, SLUA309A, Avoiding Audible Noise at Light Loads when using Leading Edge Triggered PFC Converters, Sep. 2004.

Texas Instruments, Application Report SLUA369B, 350-W, Two-Phase Interleaved PFC Pre-Regulator Design Review, Mar. 2007.

Unitrode, High Power-Factor Preregulator, Oct. 1994.

Texas Instruments, Transition Mode PFC Controller, SLUS515D, Jul. 2005.

Unitrode Products From Texas Instruments, Programmable Output Power Factor Preregulator, Dec. 2004.

Unitrode Products From Texas Instruments, High Performance Power Factor Preregulator, Oct. 2005.

Texas Instruments, UCC3817 BiCMOS Power Factor Preregulator Evaluation Board User's Guide, Nov. 2002.

Unitrode, L. Balogh, Design Note UC3854A/B and UC3855A/B Provide Power Limiting with Sinusoidal Input Current for PFC Front Ends, SLUA196A, Nov. 2001.

A. Silva De Morais et al., A High Power Factor Ballast Using a Single Switch with Both Power Stages Integrated, IEEE Transactions on Power Electronics, vol. 21, No. 2, Mar. 2006.

M. Ponce et al., High-Efficient Integrated Electronic Ballast for Compact Fluorescent Lamps, IEEE Transactions on Power Electronics, vol. 21, No. 2, Mar. 2006.

A. R. Seidel et al., A Practical Comparison Among High-Power-Factor Electronic Ballasts with Similar Ideas, IEEE Transactions on Industry Applications, vol. 41, No. 6, Nov.-Dec. 2005.

F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.

J. A. Vilela Jr. et al., An Electronic Ballast with High Power Factor and Low Voltage Stress, IEEE Transactions on Industry Applications, vol. 41, No. 4, Jul./Aug. 2005.

S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.

M. K. Kazimierczuk et al., Electronic Ballast for Fluorescent Lamps, IEEE Transactions on Power Electronics, vol. 8, No. 4, Oct. 1993.

S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.

H. L. Cheng et al., A Novel Single-Stage High-Power-Factor Electronic Ballast with Symmetrical Topology, IEEE Transactions on Power Electronics, vol. 50, No. 4, Aug. 2003.

J.W.F. Dorleijn et al., Standardisation of the Static Resistances of Fluorescent Lamp Cathodes and New Data for Preheating, Industry Applications Conference, vol. 1, Oct. 13, 2002-Oct. 18, 2002.

Q. Li et al., An Analysis of the ZVS Two-Inductor Boost Converter under Variable Frequency Operation, IEEE Transactions on Power Electronics, vol. 22, No. 1, Jan. 2007.

H. Peng et al., Modeling of Quantization Effects in Digitally Controlled DC-DC Converters, IEEE Transactions on Power Electronics, vol. 22, No. 1, Jan. 2007.

G. Yao et al., Soft Switching Circuit for Interleaved Boost Converters, IEEE Transactions on Power Electronics, vol. 22, No. 1, Jan. 2007.

C. M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.

W. Zhang et al., A New Duty Cycle Control Strategy for Power Factor Correction and FPGA Implementation, IEEE Transactions on Power Electronics, vol. 21, No. 6, Nov. 2006.

H. Wu et al., Single Phase Three-Level Power Factor Correction Circuit with Passive Lossless Snubber, IEEE Transactions on Power Electronics, vol. 17, No. 2, Mar. 2006.

O. Garcia et al., High Efficiency PFC Converter to Meet EN61000-3-2 and A14, Proceedings of the 2002 IEEE International Symposium on Industrial Electronics, vol. 3, 2002.

P. Lee et al., Steady-State Analysis of an Interleaved Boost Converter with Coupled Inductors, IEEE Transactions on Industrial Electronics, vol. 47, No. 4, Aug. 2000.

D.K.W. Cheng et al., A New Improved Boost Converter with Ripple Free Input Current Using Coupled Inductors, Power Electronics and Variable Speed Drives, Sep. 21-23, 1998.

B.A. Miwa et al., High Efficiency Power Factor Correction Using Interleaved Techniques, Applied Power Electronics Conference and Exposition, Seventh Annual Conference Proceedings, Feb. 23-27, 1992.

Z. Lai et al., A Family of Power-Factor-Correction Controllers, Twelfth Annual Applied Power Electronics Conference and Exposition, vol. 1, Feb. 23, 1997-Feb. 27, 1997.

L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.

Fairchild Semiconductor, Application Note 42030, Theory and Application of the ML4821 Average Current Mode PFC Controller, Oct. 25, 2000.

Unitrode Products From Texas Instruments, BiCMOS Power Factor Preregulator, Feb. 2006.

D. Hausman, Lutron, RTISS-TE Operation, Real-Time Illumination Stability Systems for Trailing-Edge (Reverse Phase Control) Dimmers, v. 1.0 Dec. 2004.

International Rectifier, Data Sheet No. PD60230 revC, IR1150(S)(PbF), uPFC One Cycle Control PFC IC Feb. 5, 2007.

Texas Instruments, Application Report SLUA308, UCC3817 Current Sense Transformer Evaluation, Feb. 2004.

Texas Instruments, Application Report SPRA902A, Average Current Mode Controlled Power Factor Correctiom Converter using TMS320LF2407A, Jul. 2005.

Unitrode, Design Note DN-39E, Optimizing Performance in UC3854 Power Factor Correction Applications, Nov. 1994.

Fairchild Semiconductor, Application Note 42030, Theory and Application of the ML4821 Average Currrent Mode PFC Controller, Aug. 1997.

Fairchild Semiconductor, Application Note AN4121, Design of Power Factor Correction Circuit Using FAN7527B, Rev.1.0.1, May 30, 2002.

Fairchild Semiconductor, Application Note 6004, 500W Power-Factor-Corrected (PFC) Converter Design with FAN4810, Rev. 1.0.1, Oct. 31, 2003.

Fairchild Semiconductor, FAN4822, ZVA Average Current PFC Controller, Rev. 1.0.1 Aug. 10, 2001.

Fairchild Semiconductor, ML4821, Power Factor Controller, Rev. 1.0.2, Jun. 19, 2001.

Fairchild Semiconductor, ML4812, Power Factor Controller, Rev. 1.0.4, May 31, 2001.

Linear Technology, 100 Watt LED Driver, Linear Technology, 2006.

Fairchild Semiconductor, FAN7544, Simple Ballast Controller, Rev. 1.0.0, 2004.

Fairchild Semiconductor, FAN7532, Ballast Controller, Rev. 1.0.2, Jun. 2006.

Fairchild Semiconductor, FAN7711, Ballast Control IC, Rev. 1.0.2, Mar. 2007.

Fairchild Semiconductor, KA7541, Simple Ballast Controller, Rev. 1.0.3, 2001.

ST Microelectronics, L6574, CFL/TL Ballast Driver Preheat and Dimming, Sep. 2003.

ST Microelectronics, AN993, Application Note, Electronic Ballast with PFC Using L6574 and L6561, May 2004.

International Search Report and Written Opinion for PCT/US2008/062384 dated Jan. 14, 2008.

S. Dunlap et al., Design of Delta-Sigma Modulated Switching Power Supply, Circuits & Systems, Proceedings of the 1998 IEEE International Symposium, 1998.

"HV9931 Unity Power Factor LED Lamp Driver, Initial Release", Supertex Inc., Sunnyvale, CA USA 2005.

An-H52 Application Note: "HV9931 Unity Power Factor LED Lamp Driver" Mar. 7, 2007, Supertex Inc., Sunnyvale, CA, USA.

Dustin Rand et al: "Issues, Models and Solutions for Triac Modulated Phase Dimming of LED Lamps" Power Electronics Specialists Conference, 2007. PESC 2007. IEEE, IEEE, P1, Jun. 1, 2007, pp. 1398-1404.

Spiazzi G et al: "Analysis of a High-Power Factor Electronic Ballast for High Brightness Light Emitting Diodes" Power Electronics Specialists, 2005 IEEE 36th Conference on Jun. 12, 2005, Piscatawa, NJ, USA, IEEE, Jun. 12, 2005, pp. 1494-1499.

International Search Report PCT/US2008/062381 dated Feb. 5, 2008.

International Search Report PCT/US2008/056739 dated Dec. 3, 2008.

Written Opinion of the International Searching Authority PCT/US2008/062381 dated Feb. 5, 2008.

Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.

International Search Report PCT/US2008/062398 dated Feb. 5, 2008.

Partial International Search Report PCT/US2008/062387 dated Feb. 5, 2008.

Noon, Jim "UC3855A/B High Performance Power Factor Preregulator", Texas Instruments, SLUA146A, May 1996, Revised Apr. 2004.

International Search Report PCT/GB2006/003259 dated Jan. 12, 2007.

Written Opinion of the International Searching Authority PCT/US2008/056739 dated Dec. 3, 2008.

International Search Report PCT/US2008/056606 dated Dec. 3, 2008.
Written Opinion of the International Searching Authority PCT/US2008/056606 dated Dec. 3, 2008.
International Search Report PCT/US2008/056608 dated Dec. 3, 2008.
Written Opinion of the International Searching Authority PCT/US2008/056608 dated Dec. 3, 2008.
International Search Report PCT/GB2005/050228 dated Mar. 14, 2006.
International Search Report PCT/US2008/062387 dated Jan. 10, 2008.
Data Sheet LT3496 Triple Output LED Driver, Linear Technology Corporation, Milpitas, CA 2007.
Linear Technology, News Release,Triple Output LED, LT3496, Linear Technology, Milpitas, CA, May 24, 2007.
Freescale Semiconductor, Inc., Dimmable Light Ballast with Power Factor Correction, Design Reference Manual, DRM067, Rev. 1, Dec. 2005.
J. Zhou et al., Novel Sampling Algorithm for DSP Controlled 2 kW PFC Converter, IEEE Transactions on Power Electronics, vol. 16, No. 2, Mar. 2001.
A. Prodic, Compensator Design and Stability Assessment for Fast Voltage Loops of Power Factor Correction Rectifiers, IEEE Transactions on Power Electronics, vol. 22, No. 5, Sep. 2007.
M. Brkovic et al., "Automatic Current Shaper with Fast Output Regulation and Soft-Switching," S.15.C Power Converters, Telecommunications Energy Conference, 1993.
Dallas Semiconductor, Maxim, "Charge-Pump and Step-Up DC-DC Converter Solutions for Powering White LEDs in Series or Parallel Connections," Apr. 23, 2002.
Freescale Semiconductor, AN3052, Implementing PFC Average Current Mode Control Using the MC9S12E128, Nov. 2005.
D. Maksimovic et al., "Switching Converters with Wide DC Conversion Range," Institute of Electrical and Electronic Engineer's (IEEE) Transactions on Power Electronics, Jan. 1991.
V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.
S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.
K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.
K. Leung et al., "Dynamic Hysteresis Band Control of the Buck Converter with Fast Transient Response," IEEE Transactions on Circuits and Systems—II: Express Briefs, vol. 52, No. 7, Jul. 2005.
Y. Ohno, Spectral Design Considerations for White LED Color Rendering, Final Manuscript, Optical Engineering, vol. 44, 111302 (2005).
S. Skogstad et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.
J. Turchi, Four Key Steps to Design a Continuous Conduction Mode PFC Stage Using the NCP1653, ON Semiconductor, Publication Order No. AND184/D, Nov. 2004.
Megaman, D or S Dimming ESL, Product News, Mar. 15, 2007.
J. Qian et al., New Charge Pump Power-Factor-Correction Electronic Ballast with a Wide Range of Line Input Voltage, IEEE Transactions on Power Electronics, vol. 14, No. 1, Jan. 1999.
P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.
J. Qian et al., Charge Pump Power-Factor-Correction Technologies Part II: Ballast Applications, IEEE Transactions on Power Electronics, vol. 15, No. 1, Jan. 2000.

Chromacity Shifts in High-Power White LED Systems due to Different Dimming Methods, Solid-State Lighting, http://www.lrc.rpi.edu/programs/solidstate/completedProjects.asp?ID=76, printed May 3, 2007.
S. Chan et al., Design and Implementation of Dimmable Electronic Ballast Based on Integrated Inductor, IEEE Transactions on Power Electronics, vol. 22, No. 1, Jan. 2007.
M. Madigan et al., Integrated High-Quality Rectifier-Regulators, IEEE Transactions on Industrial Electronics, vol. 46, No. 4, Aug. 1999.
T. Wu et al., Single-Stage Electronic Ballast with Dimming Feature and Unity Power Factor, IEEE Transactions on Power Electronics, vol. 13, No. 3, May 1998.
F. Tao et al., "Single-Stage Power-Factor-Correction Electronic Ballast with a Wide Continuous Dimming Control for Fluorescent Lamps," IEEE Power Electronics Specialists Conference, vol. 2, 2001.
Azoteq, IQS17 Family, IQ Switch®—ProxSense™ Series, Touch Sensor, Load Control and User Interface, IQS17 Datasheet V2.00.doc, Jan. 2007.
C. Dilouie, Introducing the LED Driver, EC&M, Sep. 2004.
S. Lee et al., TRIAC Dimmable Ballast with Power Equalization, IEEE Transactions on Power Electronics, vol. 20, No. 6, Nov. 2005.
L. Gonthier et al., EN55015 Compliant 500W Dimmer with Low-Losses Symmetrical Switches, 2005 European Conference on Power Electronics and Applications, Sep. 2005.
Why Different Dimming Ranges? The Difference Between Measured and Perceived Light, 2000 http://www.lutron.com/ballast/pdf/LutronBallastpg3.pdf.
D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.
Light Dimmer Circuits, www.epanorama.net/documents/lights/lightdimmer.html, printed Mar. 26, 2007.
Light Emitting Diode, http://en.wikipedia.org/wiki/Light-emitting_diode, printed Mar. 27, 2007.
Color Temperature, www.sizes.com/units/color_temperature.htm, printed Mar. 27, 2007.
S. Lee et al., A Novel Electrode Power Profiler for Dimmable Ballasts Using DC Link Voltage and Switching Frequency Controls, IEEE Transactions on Power Electronics, vol. 19, No. 3, May 2004.
Y. Ji et al., Compatibility Testing of Fluorescent Lamp and Ballast Systems, IEEE Transactions on Industry Applications, vol. 35, No. 6, Nov./Dec. 1999.
National Lighting Product Information Program, Specifier Reports, "Dimming Electronic Ballasts," vol. 7, No. 3, Oct. 1999.
Supertex Inc., Buck-based LED Drivers Using the HV9910B, Application Note AN-H48, Dec. 28, 2007.
D. Rand et al., Issues, Models and Solutions for Triac Modulated Phase Dimming of LED Lamps, Power Electronics Specialists Conference, 2007.
Supertex Inc., HV9931 Unity Power Factor LED Lamp Driver, Application Note AN-H52, Mar. 7, 2007.
Supertex Inc., 56W Off-line LED Driver, 120VAC with PFC, 160V, 350mA Load, Dimmer Switch Compatible, DN-H05, Feb. 2007.
ST Microelectronics, Power Factor Corrector L6561, Jun. 2004.
Fairchild Semiconductor, Application Note 42047 Power Factor Correction (PFC) Basics, Rev. 0.9.0 Aug. 19, 2004.
M. Radecker et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.
M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.
Fairchild Semiconductor, FAN4800, Low Start-up Current PFC/PWM Controller Combos, Nov. 2006.
Fairchild Semiconductor, FAN4810, Power Factor Correction Controller, Sep. 24, 2003.
Fairchild Semiconductor, FAN4822, ZVS Average Current PFC Controller, Aug. 10, 2001.

Fairchild Semiconductor, FAN7527B, Power Factor Correction Controller, 2003.

Fairchild Semiconductor, ML4821, Power Factor Controller, Jun. 19, 2001.

Freescale Semiconductor, AN1965, Design of Indirect Power Factor Correction Using 56F8001E, Jul. 2005.

International Search Report for PCT/US2008/051072, mailed Jun. 4, 2008

Power Integrations, Inc., "TOP200-4/14 TOPSwitch Family Three-terminal Off-line PWM Switch", XP-002524650, Jul. 1996, Sunnyvale, California.

Texas Instruments, SLOS318F, "High-Speed, Low Noise, Fully-Differential I/O Amplifiers," THS4130 and THS4131, US, Jan. 2006.

International Search Report and Written Opinion, PCT US20080062387, dated Feb. 5, 2008.

International Search Report and Written Opinion, PCT US200900032358, dated Jan. 29, 2009.

Hirota, Atsushi et al, "Analysis of Single Switch Delta-Sigma Modulated Pulse Space Modulation PFC Converter Effectively Using Switching Power Device," IEEE, US, 2002.

Prodic, Aleksandar, "Digital Controller for High-Frequency Rectifiers with Power Factor Correction Suitable for On-Chip Implementation," IEEE, US, 2007.

International Search Report and Written Opinion, PCT US20080062378, dated Feb. 5, 2008.

International Search Report and Written Opinion, PCT US20090032351, dated Jan. 29, 2009.

Erickson, Robert W. et al, "Fundamentals of Power Electronics," Second Edition, Chapter 6, Boulder, CO, 2001.

Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.

Texas Instruments, SLUS828B, "8-Pin Continuous Conduction Mode (CCM) PFC Controller", UCC28019A, US, revised Apr. 2009.

Analog Devices, "120 kHz Bandwidth, Low Distortion, Isolation Amplifier", AD215, Norwood, MA, 1996.

Burr-Brown, ISO120 and ISO121, "Precision Los Cost Isolation Amplifier," Tucson AZ, Mar. 1992.

Burr-Brown, ISO130, "High IMR, Low Cost Isolation Amplifier," SBOS220, US, Oct. 2001.

International Search Report and Written Report PCT US20080062428 dated Feb. 5, 2008.

Prodic, A. et al, "Dead Zone Digital Controller for Improved Dynamic Response of Power Factor Preregulators," IEEE, 2003.

* cited by examiner

ADJUSTABLE CONSTANT CURRENT SOURCE WITH CONTINUOUS CONDUCTION MODE ("CCM") AND DISCONTINUOUS CONDUCTION MODE ("DCM") OPERATION

CROSS-REFERENCE TO RELATED APPLICATION

This application is related to and cross-references U.S. application Ser. No. 12/107,613 entitled "Power Factor Correction (PFC) Controller and Method Using a Finite State Machine to Adjust the Duty Cycle of a PWM Control Signal" filed on Apr. 22, 2008 (Inventor: John Melanson); U.S. application Ser. No. 12/110,714 filed on Apr. 28, 2008 entitled "Discontinuous Conduction Mode (DCM) Using Sensed Current for a Switch-Mode Converter" (Inventor: John Melanson); and U.S. application Ser. No. 12/113,536 filed on May 1, 2008 entitled "Switch-Mode Converter Operating in a Hybrid Discontinuous Conduction Mode (DCM)/Continuous Conduction Mode (CCM). That Uses Double or More Pulses in a Switching Period" (Inventor: John Melanson).

BACKGROUND OF THE INVENTION

1. Field of the Invention

The present invention relates in general to the field of signal processing, and, more specifically, to apparatuses and methods for providing an adjustable constant current source which operates in both Discontinuous Conduction Mode (DCM) and Continuous Conduction Mode (CCM).

2. Description of the Related Art

Figure 1:
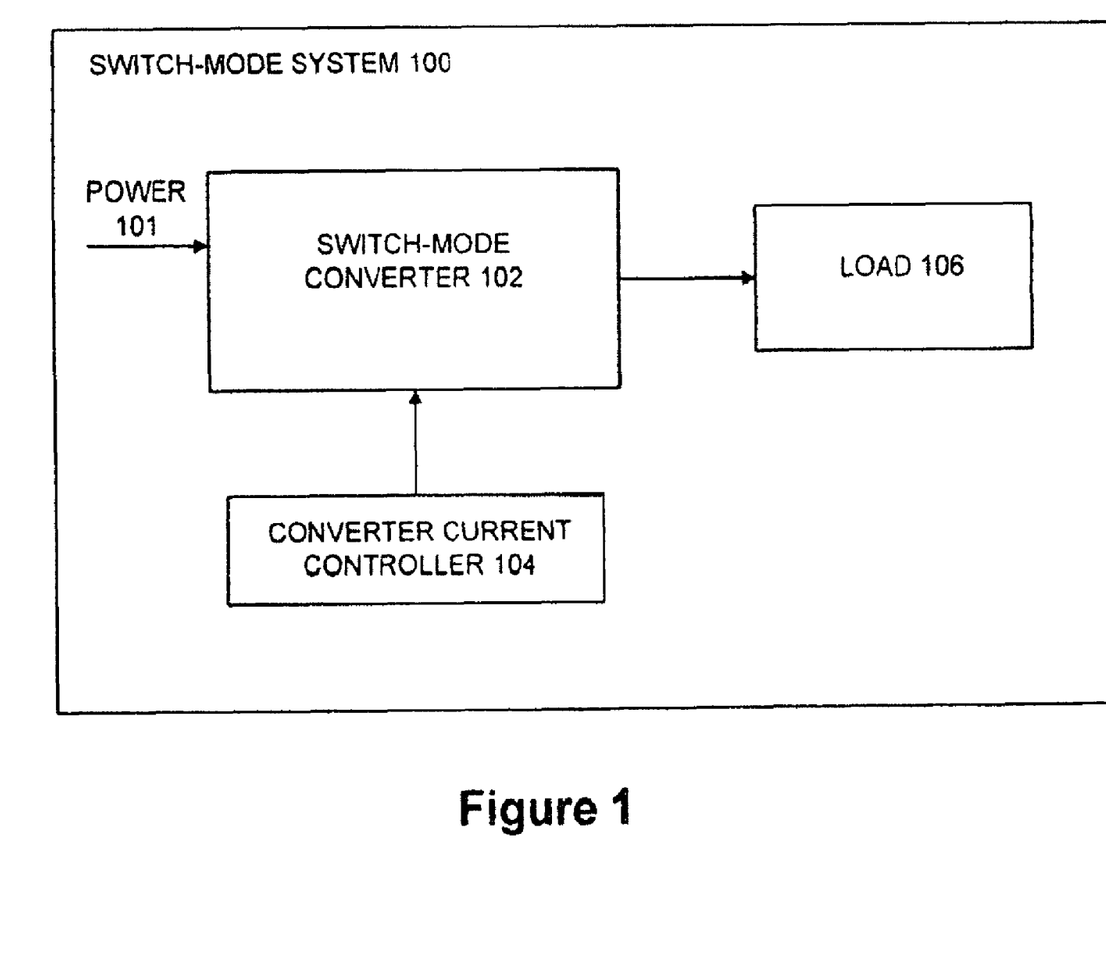
FIG. 1 depicts an exemplary switch-mode system.

Switch-mode systems are well known in the art. FIG. 1 shows an exemplary switch-mode system 100. Switch-mode system 100 includes a switch-mode converter power stage 102, a converter current controller 104, and a load 106. Power 101 is fed into switch-mode converter power stage 102. Switch-mode system 100 utilizes switch-mode converter power stage 102 to convert alternating current (AC) voltages (such as line/mains voltages) to direct current (DC) voltages or DC-to-DC wherein the input current is proportional to the input voltage. Converter current-controller 104 controls the current of switch-mode converter power-stage 102, and switch-mode-converter power stage 102 accordingly drives load 106. An exemplary switch-mode converter power stage 102 may be a buck converter or a boost converter. For switch-mode converter power stage 102, two modes of switching stage operation exist: Discontinuous Conduction Mode ("DCM") and Continuous Conduction Mode ("CCM").

Figure 2A:
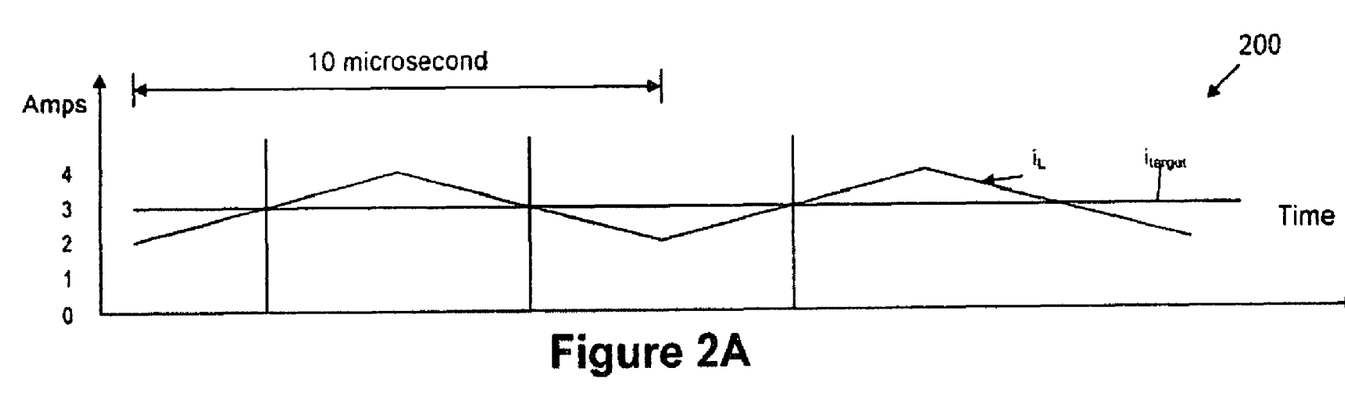
FIG. 2A depicts exemplary current waveforms of inductor current $i_L$ and target current $i_{target}$ for switch-mode converter 102 operating in Continuous Conduction Mode ("CCM") shown at a time scale of 10 milliseconds.
Figure 2B:
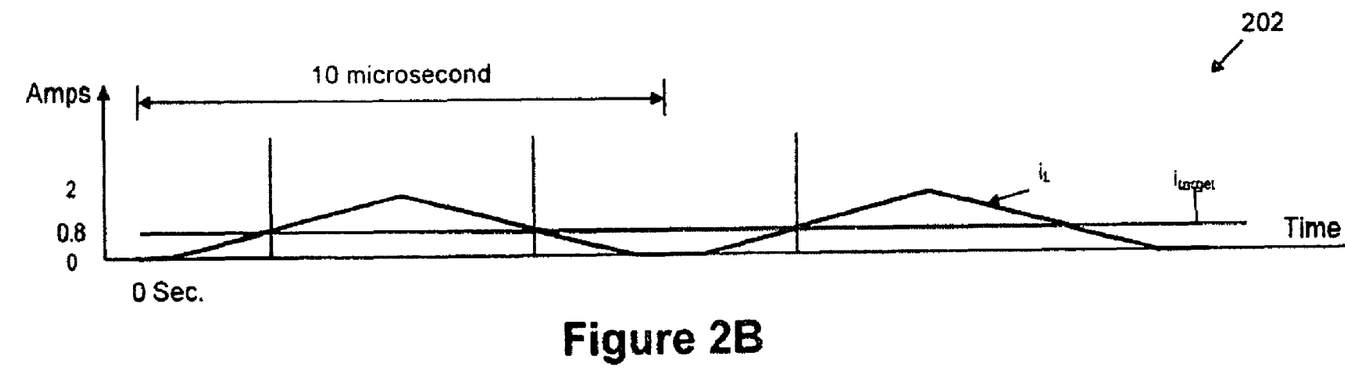
FIG. 2B depicts exemplary current waveforms of inductor current $i_L$ and target current $i_{target}$ for switch-mode converter 102 operating in Discontinuous Conduction Mode ("DCM") shown at a time scale of 10 milliseconds.

In CCM, the switch of switch-mode-converter power stage 102 switches "ON" by converter current controller 104 when the inductor current $i_L$ of converter current controller 104 is non-zero, and the current in the energy transfer inductor of converter current controller 104 never reaches zero during the switching cycle. FIG. 2A shows exemplary target current $i_{target}$ (for inductor current $i_L$) having a value of three (3) amp. FIG. 2A further shows inductor current $i_L$ has a period of ten (10) microsecond and is always non-zero in value. In CCM, the current swing is less than in DCM, which results in lower $I^2R$ power losses and lower ripple current for inductor current $i_L$ which results in lower inductor core losses. The lower voltage swing also reduces Electro Magnetic Interference (EMI), and a smaller input filter can then be used. Since the switch of switch-mode converter power stage 102 is turned "OFF" when the inductor current $i_L$ is not equal to zero, the diode of switch-mode converter power stage 102 needs to be very fast in terms of reverse recovery in order to minimize losses. In DCM, a switch of switch-mode converter power stage 102 is turned on (e.g., "ON") by converter current controller 104 when the inductor current $i_L$ of the inductor of switch-mode converter power stage 102 equals zero. FIG. 2B shows exemplary target current $i_{target}$ having a value of 0.8 amp. FIG. 2B further shows inductor current $i_L$ has a period of ten (10) microsecond and does fall to the zero value at a portion of each period.

As an example, for a switch-mode system 100 used to drive a Light Emitting Diode (LED) lighting system, it is important to have an accurate constant current output that is adjustable across a wide dynamic range, such as a range of one hundred-to-one (100:1). Such an accurate adjustable constant output requires a switch-mode converter power stage 102 that can smoothly transition between CCM and DCM and provide a controlled output in both CCM and DCM. For high target current values $i_{target}$ that are set for inductor current $i_L$, the current ripple needs to be minimized. Such low current ripple generally calls for operation of the switch-mode converter power stage 102 to be in CCM. Unless the inductor of switch-mode converter power stage 102 is greatly oversized, switch-mode converter power stage 102 will operate in DCM at a lower average current $i_{average}$ for inductor current $i_L$. If the current of switch-mode converter power stage 102 in CCM mode is controlled in such a way that the time above target current $i_{target}$ and the time below that target current $i_{target}$ are equal, then the average current $i_{average}$ is equal to the target current $i_{target}$, assuming linear (non-saturating) operation of the inductor. CCM operation of switch-mode converter power stage 102 generally does not require knowing the inductor value L (or scaled: inductor constant F*L product wherein F may be an on-time period divided by the count value of the on-time period) nor the input/output ratio D in order to provide such accurate constant average current output.

However, providing a smooth transition between CCM and DCM for a converter power stage 102 has its challenges. For example, in DCM, the inductor value L (or scaled inductor F*L product) and input/output ratio D need to be known since they directly affect the current calibration. Any inaccuracy will cause a differential non-linearity ("DNL") error in the effective current Digital-to-Analog Converter ("DAC"). Thus, in order to provide at least a smoother transition between CCM and DCM, there are needs and desires to discover, observe, and/or derive the inductor value L (or scaled inductor constant F*L product) and the input/output ratio D of a switch-mode converter system, particularly when the switch-mode converter system operates in DCM. The attaining of such measurements allows the on-time or the total operating period for the switch of the switch-mode converter 102 to be controlled so that an accurate adjustable constant average current output for the inductor current $i_L$ is provided.

SUMMARY OF THE INVENTION

A converter system and method of operating a converter system are disclosed. The converter system comprises a converter power stage that can operate in a Discontinuous Conduction Mode (DCM) in a range of output currents and a Continuous Conduction Mode (CCM) in another range of output currents. The converter power stage includes at least an inductor with an inductor value and a control switch. The converter power stage provides an average current. A current controller is coupled to the converter power stage. When the converter power stage operates in DCM, the converter power stage provides the average current and the current controller is configured to measure the inductor value of the inductor.

Furthermore, the current controller can also be configured to measure an input-to-output conversion ratio from the converter power stage.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 3:
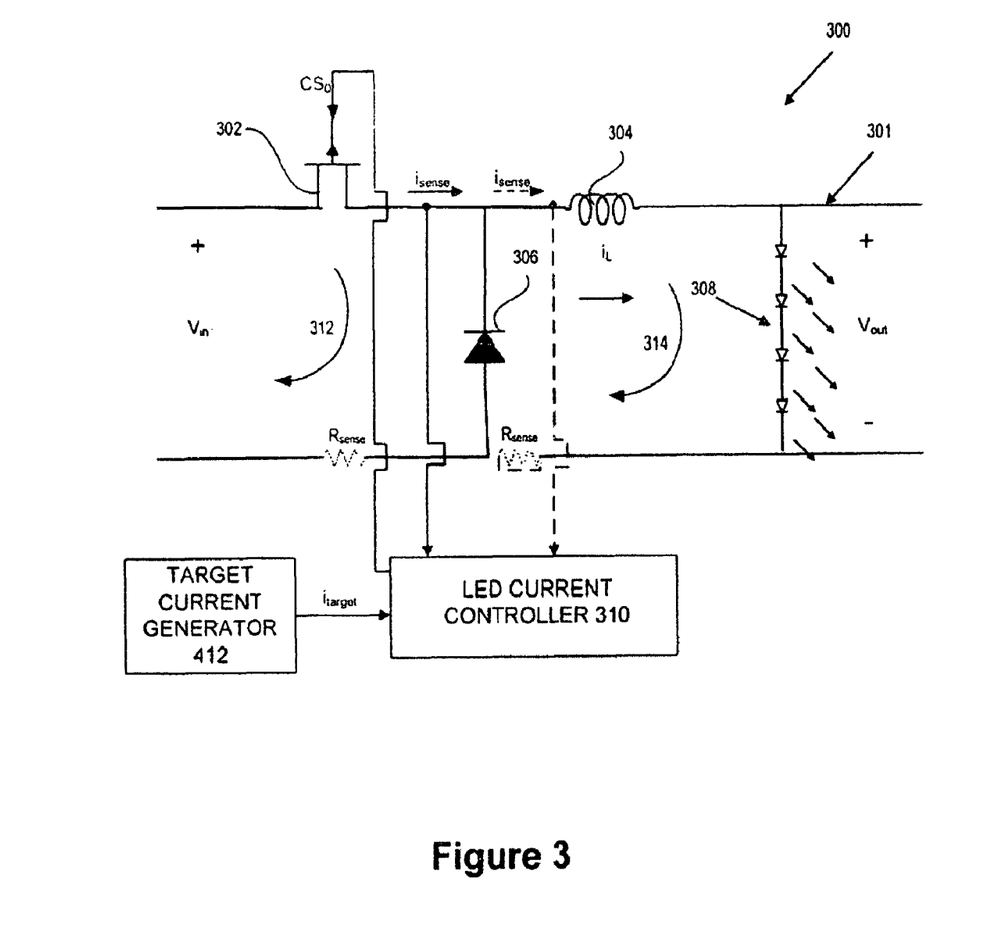
FIG. 3 depicts details of an exemplary switch-mode buck converter power stage controlled by a Light Emitting Diode ("LED") current controller for driving LEDs.

FIG. 3 depicts details of an Light Emitting Diode ("LED") lighting system 300 having an exemplary switch-mode buck converter power stage 301 controlled by a Light Emitting Diode. ("LED") current controller 310 for driving LEDs 308. LED lighting system 300 is an exemplary system illustrating an embodiment of the present invention, and the present invention is not in any way limited to an LED lighting system nor the use of a buck converter, LED current controller, and LEDs. The present invention can also be used for other suitable applications as well as utilize other converters/converter power stages (e.g., boost converters) or controllers.

Switch-mode buck converter power stage 301 comprises a control switch (e.g., Field Effect Transistor ("FET")) 302 having a source and drain coupled in series with an inductor 304 as shown in FIG. 3. The source of FET 302 is coupled to a positive side of input voltage $V_{in}$. Diode 306 is coupled across the input voltage $V_{in}$ in which a first end of a diode 306 is coupled between the drain of FET 302 and inductor 304 while a second end of diode 306 is coupled to a negative side of the input voltage $V_{in}$. A string of LEDs 308 is coupled across the output voltage $V_{out}$ (e.g., coupled from the positive side to negative side of output voltage $V_{out}$). The string of LEDs 308 may, for example, include twenty (20) to one hundred (100) LEDs coupled together in series.

An end of sense resistor $R_{sense}$ is coupled to the negative side of input voltage $V_{in}$, and the other end of sense resistor $R_{sense}$ is coupled to the second end of diode 306. Sense resistor $R_{sense}$ is utilized to detect the sense current $i_{sense}$ that is flowing through FET 302. For the sense current $i_{sense}$ being provided to LED current controller 310 from a node that is at the drain of FET 302 as shown in FIG. 3, the sense resistor $R_{sense}$ can be located anywhere in the current loop 312. Alternatively, as shown in dotted lines, an end of sense resistor $R_{sense}$ is coupled to the second end of diode 306, and the other end of sense resistor $R_{sense}$ is coupled to the negative side of the output voltage $V_{out}$. For the sense current $i_{sense}$ being provided to LED current controller 310 from a node that is at an input end of inductor 304 as shown in FIG. 3, the sense resistor $R_{sense}$ can be located anywhere in the current loop 314. LED current controller 310 outputs a switch control signal $CS_0$ which is fed into the gate of FET 302 and controls activation and deactivation of FET 302 as a switch.

For example, the output voltage $V_{out}$ of exemplary LED lighting system 300 at full brightness intensity can be at or around four hundred milliamperes (400 mA). Switch-mode buck converter power stage 301 operates in CCM when the output voltage $V_{out}$ is at least fifty (50) to one hundred (100) milliamperes (50 to 100 mA). When the output voltage $V_{out}$ falls below 50 to 100 mA, switch-mode buck converter power stage 301 operates in DCM.

Figure 4:
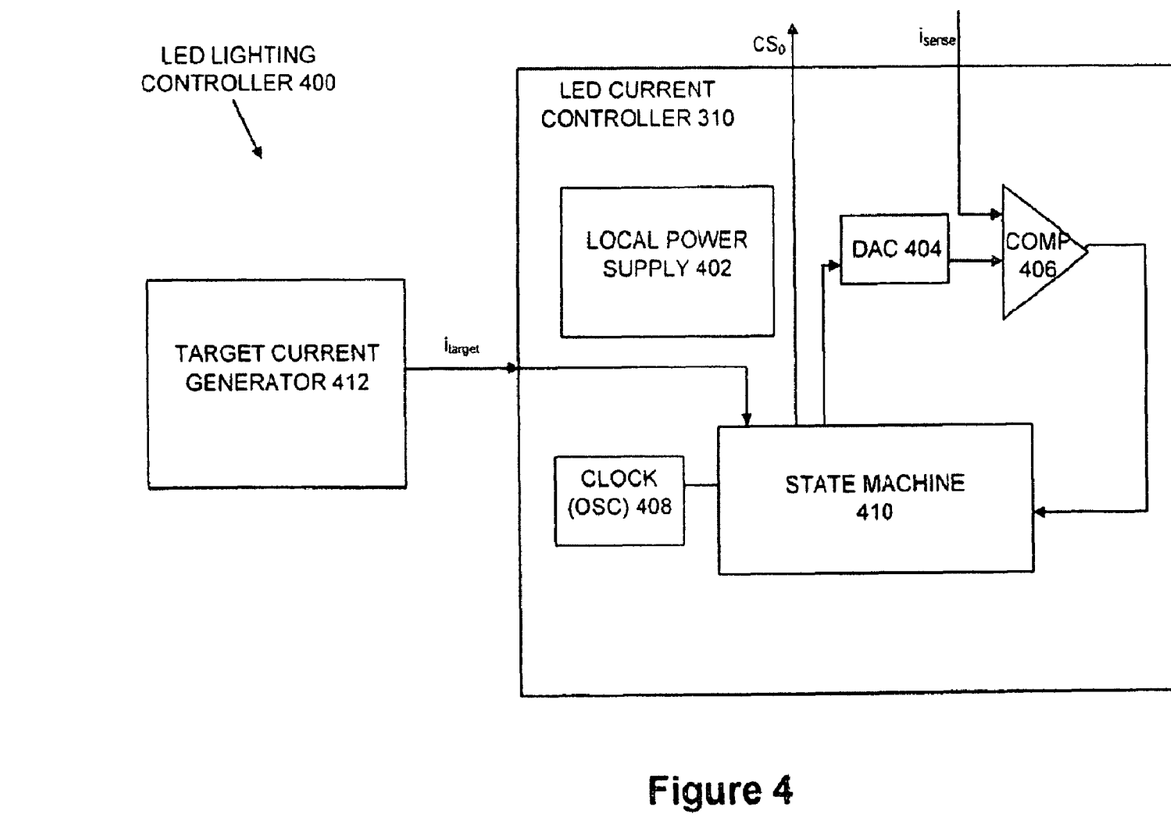
FIG. 4 depicts details of an exemplary LED lighting controller that includes a target current generator and a LED current controller.

In LED lighting system 300, the load inductor current $i_L$ is always measurable, that is, the high side switch of FET 302 is measurable. Referring now to FIGS. 3 and 4, a target current generator 412 is coupled to the LED current controller 310 for feeding a target current $i_{target}$ into LED current controller 310. Target current generator 412 and LED current controller 310 together make up LED lighting controller 400 as shown in FIG. 4. LED current controller 310 includes a local power supply 402 which provides power to the various components of LED current controller 310. LED current controller 310 further includes a state machine 410 which receives the target current $i_{target}$ that is fed in from target current generator 412. State machine 410 provides a digital signal that is reflective or representative of the target current $i_{target}$ to digital-to-analog converter 404. DAC 404 converts the representative digital signal into a corresponding analog signal. The analog signal and the sense current $i_{sense}$ are fed into comparator (COMP) 406 for comparison, and the result of the comparison is fed into state machine 410. LED current controller 310 further includes a clock (oscillator) 408, and clock (osc) 408 is coupled to and utilized by state machine 410. The techniques (e.g., first, second, and third techniques) of the present invention in providing an accurate adjustable constant average inductor current output $i_{avg}$ when a converter operates in DCM are implemented in state machine 410. Furthermore, LED controller 310 may be implemented on a single integrated circuit (IC) or single IC substrate. Target current generator 412 may also be part of the single IC or may be external to the IC.

Figure 5:
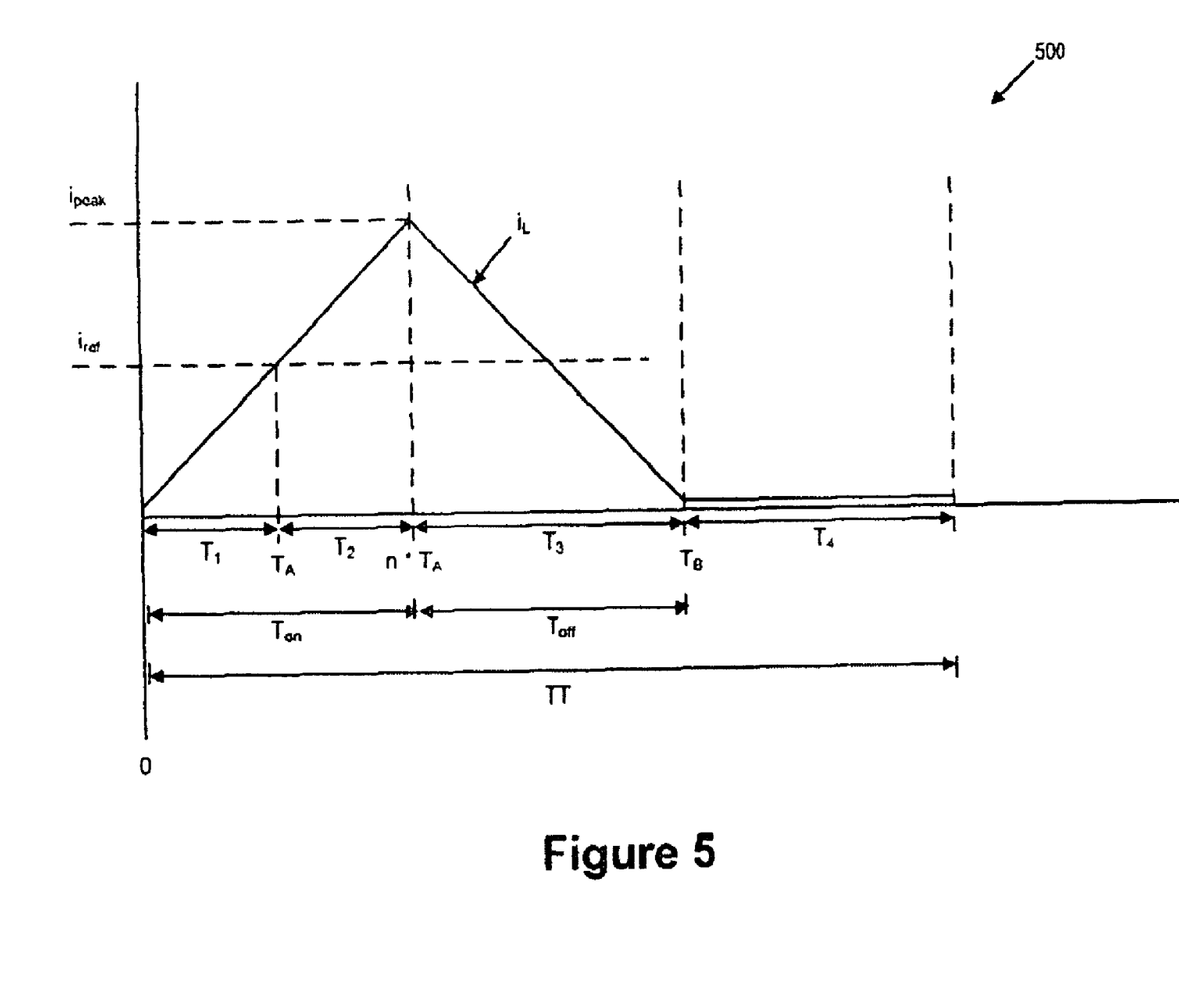
FIG. 5 depicts an exemplary current waveform for inductor current $i_L$ of exemplary switch-mode buck converter that is used to illustrate a first exemplary technique to provide an accurate constant average inductor current output when exemplary switch-mode buck converter power stage operates in DCM to help allow for a smooth transition of switch-mode buck converter power stage between CCM and DCM.

Referring now to FIGS. 3 and 5, when a clock period of clock (oscillator) 408 of LED current controller 310 is started, FET 302 is turned on. A reference current $i_{ref}$ is set at a suitable value, which is some pre-selected current value between zero and the peak current $i_{peak}$. Reference current $i_{ref}$ is set at a value that can be accurately measured but allows the load inductor current $i_L$ to ramp up to the peak current $i_{peak}$ as well.

FIG. 5 depicts an exemplary current waveform 500 for inductor current $i_L$ of exemplary switch-mode buck converter power stage 301 that is used to illustrate a first exemplary technique to provide an accurate adjustable constant average inductor current output $i_{avg}$ when exemplary switch-mode buck converter operates in DCM. First exemplary technique help allow for a smooth transition of switch-mode buck converter power stage between CCM and DCM. As shown in FIG. 5, when the load inductor current $i_L$ reaches the reference current $i_{ref}$ at time $T_A$, the first on time period $T_1$ is determined. In other words, time period $T_1$ is the time from when FET 302 turns on and when the load inductor $i_L$ reaches the reference current $i_{ref}$. FET 302 is turned off at time $n*T_A$. Thus, the second on time period $T_2$ is determined from when the FET 302 is on at the time when the load inductor $i_L$ reaches the reference current $i_{ref}$ (e.g., at time $T_A$) to when the load inductor $i_L$ reaches the peak current $i_{peak}$ (e.g., at time $n*T_A$). n is a ratio and is preferably selected to be a ratio of 2 (e.g., 2:1). Load inductor current $i_L$ decreases in value passing through reference current $i_{ref}$ and falls to zero at time $T_B$. The off time period $T_3$ is defined from when the load inductor $i_L$ reaches the peak current $i_{peak}$ (e.g., at time $n*T_A$) until when the load inductor $i_L$ reaches zero (e.g., at time $T_B$). The total period for inductor current $i_L$ in FIG. 5 is defined as time-period TT. In this embodiment of LED lighting system 300, both the on time $T_{on}$ (which is equal to time periods $T_1+T_2$) and off time $T_{off}$ (which is equal to time period $T_3$) can be observed or measured, but only the on period $T_{on}$ and total period TT can be controlled. Therefore, in implementing the LED lighting system 300, either the on period $T_{on}$ or total period TT is controlled in order to provide an accurate constant average current output $i_{avg}$ for inductor current $i_L$.

The input/output ratio D and the ratio C1 involving the inductor value (inductance) L for inductor 304 can be measured and/or determined from the following mathematical relationships:

Peak current $i_{peak}=T_{on}*(V_{in}-V_{out})/L$     Equation A

Off time period $T_{off}=((V_{in}-V_{out})/V_{out})*T_{on}$     Equation B $D=V_{out}/V_{in}=T_{on}/(T_{on}+T_{off})$     Equation C Reference current $i_{ref}=T_1*(V_{in}-V_{out})/L$     Equation D Ratio $C1=i_{ref}/T_1=(V_{in}-V_{out})/L$     Equation E With respect to the present invention, the measuring and determination of inductor value (inductance) L for inductor 304 is not in any way limited to the measurement and determination of the actual inductance of inductor 304 (e.g., measured in milli-Henries) but can be a measurement or determination of any value that is representative or reflective of the inductance value. For example, such a representative or reflective value may be in conformity with a mathematical rate of increase related to the inductance, a scaled version of the inductance, a binary format of the inductance, or a direct, indirect or inverse proportional relationship to the inductance (e.g., L; 1/L, etc.).

Ratio C1 provides a relationship in which the inductor value L is determined based on the rate of rise (e.g., $i_{ref}/T_1$) of the current when FET 302 is switched on. The input-to-output conversion ratio D for converter 301 is calculated from an on time (ramp-up time) $T_{on}$ (=$T_1+T_2$) of inductor current $i_L$ and an off-time (ramp-down time) $T_{off}$ (=$T_3$) of inductor current $i_L$. Since the above values can be determined, the average constant output inductor current $i_{AVG}$ for inductor current $i_L$ is determined as follows:

$$\begin{aligned}i_{AVG} &= i_{peak}/2*((T_{on}+T_{off})/TT) \quad \text{Equation F}\\ &= (T_{on}*(V_{in}-V_{out})/L)/2 *\\ &\quad ((T_{on}+((V_{in}-V_{out})/V_{out})*T_{on}))/TT))\\ &= T_{on}^2/2*(V_{in}-V_{out})/L *\\ &\quad (1+(V_{in}-V_{out})/V_{out}))/TT\\ &= T_{on}^2/2*(V_{in}-V_{out})/L*(V_{in}/V_{out})*(1/TT)\\ &= T_{on}^2/2*C1/D*(1/TT)\end{aligned}$$

On time $T_{on}$ can be determined and respectively controlled as follows:

$T_{on}$=Square Root($2*i_{AVG}*D/C1*TT$)     Equation G

As shown in Equation G, on time $T_{on}$ for FET 302 can be controlled for providing a given adjustable average constant output inductor current $i_{AVG}$ for inductor current $i_L$ by using the measured, determined, and/or known values for the input/output ratio D, the ratio C1, and the total period TT of inductor current $i_L$.

Figure 6:
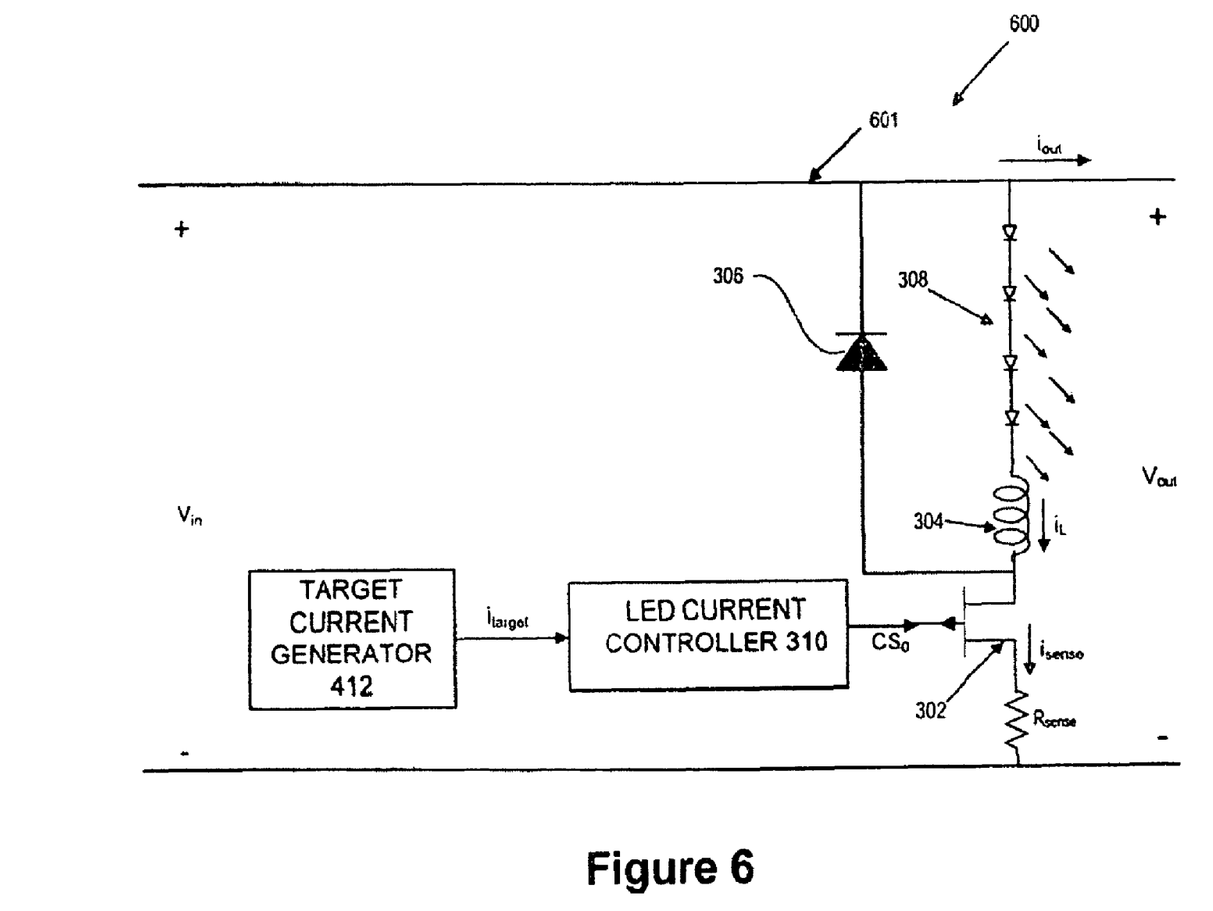
FIG. 6 depicts details of another exemplary switch-mode buck converter power stage controlled by a LED current controller for driving LEDs.

FIG. 6 depicts details of another Light Emitting Diode ("LED") lighting system 600 having another exemplary switch-mode buck converter power stage 601 controlled by a Light Emitting Diode ("LED") current controller 310 for driving LEDs 308. FIG. 6 also shows LED current controller 310 coupled to target current generator 412, and as mentioned before, when FIG. 4 was discussed earlier, target current generator 412 and LED current controller 310 make up LED lighting controller 400. LED lighting system 600 is another exemplary system illustrating another embodiment of the present invention, and the present invention is not in any way limited to an LED lighting system nor the use of a buck converter power stage, LED current controller, and LEDs. The present invention can also be used for other suitable applications as well as utilize other converters/converter power stages (e.g., boost converters) or controllers.

Switch-mode buck converter power stage 601 comprises LEDs 308, inductor 304, FET (control switch) 302, and sense resistor $R_{sense}$ coupled in series together and across the output voltage $V_{out}$ as shown in FIG. 6. One end of diode 306 is coupled to a positive side of input voltage $V_{in}$, and the other end of diode 306 is coupled at a node between inductor 304 and FET 302 as shown in FIG. 6. Output current $i_{out}$ is shown flowing at the positive side of output voltage $V_{out}$. Inductor current $i_L$ flows through inductor 304 while sense current $i_{sense}$ flows through resistor $R_{sense}$. Again, sense resistor $R_{sense}$ is utilized to detect the sense current $i_{sense}$ that is flowing through FET 302. LED current controller 310 outputs a switch control signal $CS_0$ which is fed into the gate of FET 302 and controls activation and deactivation of FET 302 as a switch. Switch-mode buck converter power stage 601 can only allow the measuring or detecting of the inductor current $i_L$ when FET 302 is on and cannot allow the measuring or detecting of inductor current $i_L$ when FET 302 is off. Thus, switch-mode buck converter power stage 601 requires sense current $i_{sense}$ only when FET 302 is on, and the low side switch 302 can be used for sensing sense current $i_{sense}$.

Figure 7:
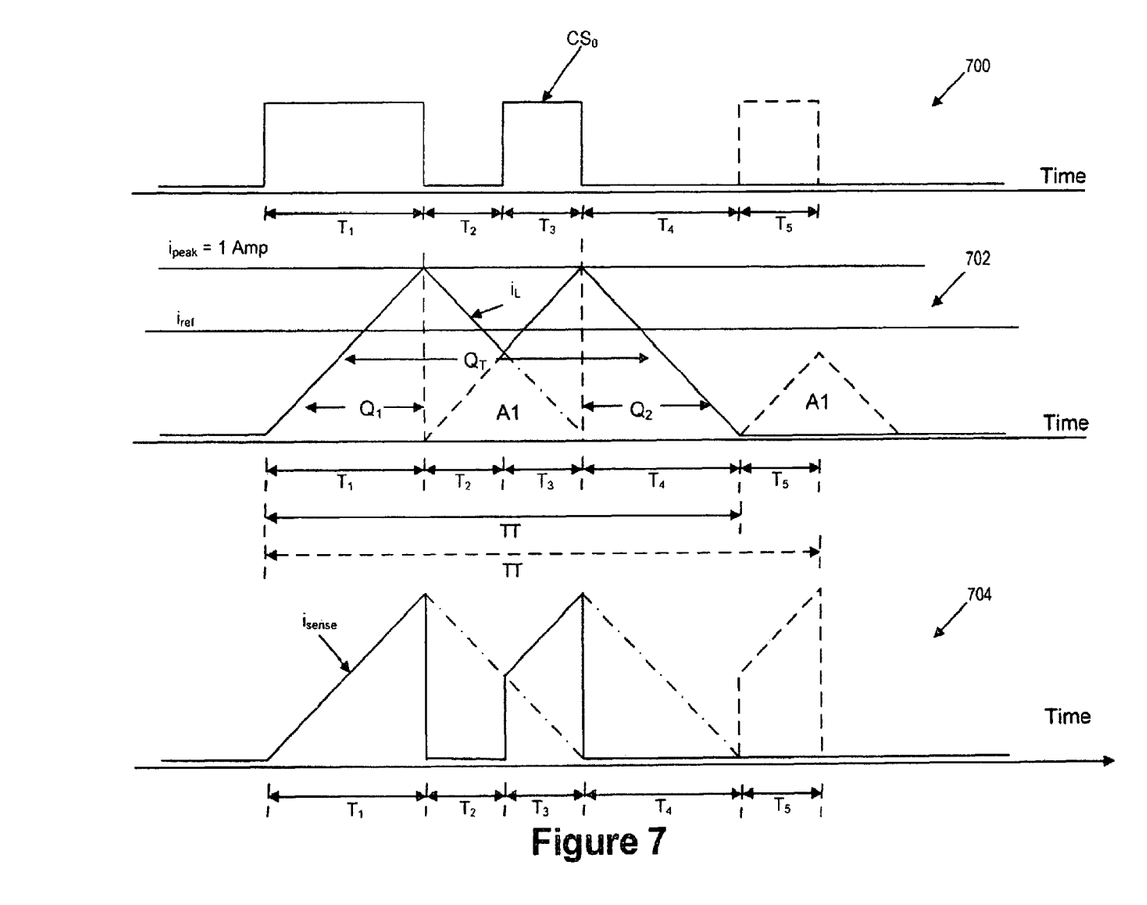
FIG. 7 depicts exemplary current waveforms for control signal $CS_0$, inductor current $i_L$, and sense current $i_{sense}$ of exemplary switch-mode buck converter power stage that are used to illustrate second and third exemplary techniques to each provide an accurate constant average inductor current output by exemplary switch-mode buck converter power stage operating in a hybrid Discontinuous Conduction Mode (DCM)/Continuous Conduction Mode (CCM) that uses double or more pulses in a switching period wherein the techniques help allow for a smooth transition of switch-mode buck converter power stage between CCM and DCM.

Referring now to FIG. 7, exemplary current waveforms 700, 702, and 704 for respective control signal $CS_0$, inductor current $i_L$, and sense current $i_{sense}$ of exemplary switch-mode buck converter power stage 601 that are used to illustrate second and third exemplary techniques to each provide an accurate adjustable constant average inductor current output $i_{avg}$ by exemplary switch-mode buck converter 601 operating in a hybrid Discontinuous Conduction Mode (DCM)/Continuous Conduction Mode (CCM) that uses double or more pulses in a switching period. The techniques help allow for a smooth transition of switch-mode buck converter power stage between CCM and DCM. U.S. application Ser. No. 12/113,536 (hereafter '536 patent application) filed on May 1, 2008 entitled "Switch-Mode Converter Operating in a Hybrid Discontinuous Conduction Mode (DCM)/Continuous Conduction Mode (CCM) That Uses Double or More Pulses in a Switching Period" (Inventor: John Melanson) discusses in detail the operation of a switch-mode converter in such hybrid DCM/CCM that uses double or more pulses in a switching period, and the '536 patent application is hereby incorporated by reference.

Referring now to waveforms 700, 702, and 704 of FIG. 7, a second exemplary technique for providing an accurate adjustable constant average inductor current output $i_{avg}$ by exemplary switch-mode buck converter power stage 601 is discussed. Control signal $CS_0$ transitions to a high value and turns on FET 302 during period $T_1$. Inductor current $i_L$ ramps up and crosses through reference current $i_{ref}$ and reaches peak current $i_{peak}$ at the end of period $T_1$. Sense current $i_{sense}$ ramps up to a peak sense current value during time period $T_1$. During time period $T_2$, control signal $CS_0$ goes to a low value and turns off FET 302. During this time period $T_2$, switch-mode buck converter 601 cannot allow the detection of the value of inductor current $i_L$, and sense current $i_{sense}$ discharges to a zero value. Control signal $CS_0$ next goes back to a high value and turns on FET 302 during time period $T_3$. Inductor current $i_L$ ramps back up and crosses through reference current $i_{ref}$ and reaches peak current $i_{peak}$ again. During this time period $T_3$, switch-mode buck converter power stage 601 can allow the value of inductor current $i_L$ to be detected, and sense current $i_{sense}$ ramps up to a peak sense current value. Control signal $CS_0$ then goes back to a low vale and turns off FET 302 during time period $T_4$. Inductor current $i_L$ ramps down to zero during time period $T_4$. During this time period $T_4$, switch-mode buck converter power stage 601 cannot allow for the detection of the value of inductor current $i_L$, and sense current $i_{sense}$ discharges to a zero value.

If time period $T_3$ is less than time period $T_1$, switch-mode buck converter power stage 601 has then entered into the hybrid DCM/CCM that uses double or more pulses in a switching period. However, if time period $T_3$ is approximately equal to time period $T_1$, then time period $T_2$ needs to be adjusted (e.g., decreased) so that time period $T_3$ will be less than time period $T_1$.

Referring now to FIG. 7, the total charge in a normal single pulse for inductor current $i_L$ would involve a normal switching time period that includes the time periods $T_1$ and $T_4$ only. The total charge for a single pulse would be the total charge $Q_1$ during time period $T_1$ and the total charge $Q_2$ during time period $T_4$. Thus, this relationship for the total charge of a normal single pulse is represented by the following mathematical relationship:

Total charge $Q_{single} = Q_1 + Q_2 = (T_1 + T_4) * i_{peak}/2$  Equation H

However, inductor current $i_L$ cannot be observed or measured during time period $T_4$. Thus, $T_4/T_1 = T_2/T_3$  Equation I $T_4 = T_1/T_3 * T_2$  Equation J The double or more pulses of a switching-period for inductor current $i_L$ as shown in current waveform 702 is basically an overlap of two single pulses (e.g., each involving time periods $T_1$ and $T_4$ only). The overlap charge area A1 being a triangular area as shown in current waveform 702. The left side length of the overlap charge area A1 is reflective of the difference between time periods $T_1$ and $T_3$ while the right side length of the overlap charge area A1 is reflective of the difference between time periods $T_4$ and $T_2$. Thus, the total charge $Q_T$ under current waveform 702 is calculated as follows:

Total Charge $Q_T = 2 * Q_{single} - A1$  Equation K

Overlap charge area $A1 = ((T_1 - T_3)/T_1) * Q_1 + ((T_4 - T_2)/T_4) * Q_2$

As shown in FIG. 7, peak current $i_{peak}$ is set equal to 1 Amp, and in the exemplary waveforms of FIG. 7, the geometry and triangular areas are set up to be the same as each other so that $T_1 = T_4$ and $T_3 = T_2$, and the mathematical relationships can be simplified.

$$\begin{aligned} \text{Overlap charge area } A1 &= ((T_1 - T_3)/T_1) * \\ & Q_1 + ((T_1 - T_3)/T_1) * Q_2 \\ &= (Q_1 + Q_2) * \\ & ((T_1 - T_3)/T_1)^2 \\ &= Q_{single} * ((T_1 - T_3)/T_1)^2 \\ &= Q_{single} * \\ & (1 - 2 * T_3/T_1 + (T_3/T_1)^2) \end{aligned}$$  Equation L $$\begin{aligned} \text{Total Charge } Q_T &= 2 * Q_{single} - (Q_{single} * \\ & (1 - 2 * T_3/T_1 + (T_3/T_1)^2)) \\ &= Q_{single} + 2 * T_3/T_1 * Q_{single} - \\ & (T_3/T_1)^2 * Q_{single} \\ &= Q_{single} * (1 + 2 * T_3/T_1 - \\ & (T_3/T_1)^2) \\ &= i_{peak}/2 * (T_1 + T_4) * \\ & (1 + 2 * T_3/T_1 - (T_3/T_1)^2) \\ &= i_{peak}/2 * (T_1 + T_1/T_3 * T_2) * \\ & (1 + 2 * T_3/T_1 - (T_3/T_1)^2) \end{aligned}$$  Equation M $$\begin{aligned} i_{avg} &= \text{Total Charge } Q_T / TT \\ &= i_{peak}/2 * (T_1 + T_1/T_2 * T_3) * \\ & (1 + 2 * T_3/T_1 - (T_3/T_1)^2)/(T_1 + T_2 + T_3 + T_4) \\ &= i_{peak}/2 * (T_1 + T_1/T_2 * T_3) * (1 + 2 * T_3/T_1 - \\ & (T_3/T_1)^2)/(T_1 + T_2 + T_3 + T_1/T_3 * T_2) \end{aligned}$$  Equation N Since time period $T_1$ is measured, time period $T_2$ is preset (e.g., by the user), time period $T_3$ is measured, the waiting time period $T_4$ can be derived from time periods $T_1$, $T_2$, and $T_3$, the peak current $i_{peak}$ is known, the average current $i_{avg}$ can be calculated and determined by Equation N above. If the $T_1/T_2$ ratio is chosen as a power of two, then the match is simple. From the time periods $T_1$, $T_2$, and $T_3$, the calculation of the total charge $Q_T = (i_{avg} * TT)$ becomes straight forward. Enough pulses based on the known time periods $T_1$, $T_2$, and $T_3$ can be created to set any value for average current $i_{avg}$, and thus, control of a constant average output current $i_{avg}$ can be provided.

Since time period $T_4$ can be derived and known, a number of single pulses (e.g., with ramp-up time period $T_1$ and ramp-down time period $T_4$) can be used to provide, respective average currents. Double or more pulses for a switching period can be used constantly, occasionally (to update the D=input/output ratio), or in any frequency manner with the single pulses.

In this second exemplary technique, ratio C1 as discussed for the first exemplary technique provides the same relationship in which the inductor value L is determined based on the rate of rise (e.g., $i_{ref}/T_1$) of the current when FET 302 for converter 601 is switched on. The input-to-output conversion ratio D for converter 601 is calculated from a total on time (ramp-up time) $T_{on}$ ($=T_1+T_3$) of inductor current $i_L$ and a total off-time (ramp-down time) $T_{off}$ ($=T_2+T_4=T_2+T_1/T_3*T_2$) of inductor current $i_L$. This second exemplary technique reflects the fact that the FET 302 is turned on again at least for a second time within the switching period TT before inductor current $i_L$ decays to zero.

Referring again to waveforms 700, 702, and 704 of FIG. 7, a third exemplary technique for providing an accurate adjustable constant average inductor current output $i_{avg}$ by exemplary switch-mode buck converter power stage 601 is further discussed. The third exemplary technique is identical to the second exemplary technique except that at the end of timing period $T_4$, an additional compensating pulse (shown in dotted line) having an on time of time period $T_5=T_1-T_3$ is triggered for control signal $CS_0$ as shown in current waveform 700. A single triangular pulse with a known charge area of A1 (e.g., identical to the overlap charge area A1) results since time periods $T_1$ and $T_3$ are known, and the single triangular pulse is added in the current waveform 702 for inductor current $i_L$. The mathematical calculations become further simplified since the total charge $Q_T$ is determined by:

Total Charge $Q_T=2*Q_{single}-A1+A1=2*Q_{single}$   Equation O

Therefore, the principles and techniques of the present invention help allow for a smooth transition of a converter power stage operate between CCM and DCM. When converter power stage 301 or 601 operates in DCM, converter power stage 301 or 601 is able to provide an average constant output current that is adjustably controlled by an inductor value that is measured and/or detected and further controlled by an input-to-output conversion ratio that is measured and/or detected. The exemplary techniques of the present invention allow the inductor value (e.g., inductor value L) and the input-to-output conversion ratio (e.g., input-to-output ratio D) to be accurately measured, determined, or discovered. Accuracy in determining the inductor value and/or the input-to-output ratio for a converter directly affect the current calibration and will help avoid or minimize differential non-linearity ("DNL") errors in the effective current Digital-to-Analog Converter ("DAC"). Thus, it is important to provide an accurate adjustable constant average current output for the inductor current $i_L$ of a switch-mode converter, especially when the switch-mode converter is operating in DCM. The present invention provides ways to provide such a constant current output.

Although the present invention has been described in detail, it should be understood that various changes, substitutions and alterations can be made hereto without departing from the spirit and scope of the invention as defined by the appended claims.

What is claimed is:

1. A converter system, comprising:
    a converter power stage that can operate in a Discontinuous Conduction Mode (DCM) in a range of output currents and a Continuous Conduction Mode (CCM) in another range of output currents wherein the converter power stage includes at least an inductor with an inductor value and a control switch and the converter power stage provides an average current, and
    a current controller coupled to the converter power stage; and
    wherein when the converter power stage operates in DCM, the converter power stage provides the average current and wherein the current controller is configured to measure the inductor value of the inductor.

2. The converter system according to claim 1, wherein the inductor value is determined from a rate of rise of an inductor current through the inductor when the control switch is on.

3. The converter system according to claim 1 wherein the current controller is configured to measure an input-to-output conversion ratio from the converter power stage.

4. The converter system according to claim 3, wherein the input-to-output conversion ratio is determined from a ramp-up time of the inductor current and a ramp-down time of the inductor current.

5. The converter system according to claim 3, wherein a sense current is detected at the control switch and wherein the input-to-output conversion ratio is determined by turning the control switch on at least a second time within a switching period before the inductor current decays to zero.

6. The converter system according to claim 5, wherein at least one additional pulse is triggered after the inductor current decays to zero so that a total charge for the inductor current over the switching period is a simple multiple of a charge for a normal single pulse over a normal switching period for the inductor current.

7. The converter system according to claim 1, wherein the converter power stage is a switch-mode buck converter power stage.

8. The converter system according to claim 7, wherein an output of the switch-mode buck converter power stage is coupled to and drives a light emitting diode (LED) load.

9. A method of operating a converter system, comprising:
    operating a converter power stage in a Discontinuous Conduction Mode (DCM) in a range of output currents and a Continuous Conduction Mode (CCM) in another range of output currents in which the converter power stage includes at least an inductor with an inductor value and a control switch;
    providing, by the converter power stage, an average current;
    controlling, by a current controller, a current in the converter power stage; and
    when the converter power stage operates in DCM, providing, by the converter power stage, the average current and configuring the current controller to measure the inductor value of the inductor.

10. The method according to claim 9, further comprising:
    determining the inductor value from a rate of rise of an inductor current through the inductor when the control switch is on.

11. The method according to claim 9, further comprising:
    configuring the current controller to measure an input-to-output conversion ratio from the converter power stage.

12. The method according to claim 11, further comprising:
    determining the input-to-output conversion ratio from a ramp-up time of the inductor current and a ramp-down time of the inductor current.

13. The method according to claim 11, further comprising:
    detecting a sense current at the control switch; and
    determining the input-to-output conversion ratio by turning the control switch on at least a second time within a switching period before the inductor current decays to zero.

14. The method according to claim 13, wherein determining the input-to-output ratio further comprises:
triggering at least one additional pulse after the inductor current decays to zero so that a total charge for the inductor current over the switching period is a simple multiple of a charge for a normal single pulse over a normal switching period for the inductor current.

15. The method according to claim 9, wherein operating a converter power stage further comprises operating a switch-mode buck converter power stage.

16. The method according to claim 15, further comprising:
coupling an output of the switch-mode buck converter power stage to a light emitting diode (LED) load and driving the LED load.

17. A current controller for controlling an inductor current of a converter power stage wherein the converter power stage includes at least an inductor with an inductor value and a control switch and can operate in a Discontinuous Conduction Mode (DCM) in a range of output currents and a Continuous Conduction Mode (CCM) in another range of output currents; comprising:
a local power supply, a state machine, a digital-to-analog converter, a comparator, and a clock coupled together in an operable manner, wherein the state machine receives a target current and the comparator compares a sense current from the converter with the target current, and the comparison is fed to the state machine to respectively provide a control signal to the switch;
the state machine is able to receive and measure from the converter power stage the inductor value so that the converter power stage is able to provide an average current of the converter power stage when the converter power stage operates in DCM.

18. The current controller according to claim 17, wherein the inductor value is able to be determined from a rate of rise of an inductor current through the inductor when the control switch is on.

19. The current controller according to claim 17, the state machine is able to receive and measure from the converter power stage an input-to-output conversion ratio.

20. The current controller according to claim 19, wherein the input-to-output conversion ratio is able to be determined from a ramp-up time of the inductor current and a ramp-down time of the inductor current.

21. The current controller according to claim 19, wherein a sense current is able to be detected at the control switch and wherein the input-to-output conversion ratio is able to be determined by turning the control switch on at least a second time within a switching period before the inductor current decays to zero.

22. The current controller according to claim 21, wherein at least one additional pulse is triggered after the inductor current decays to zero so that a total charge for the inductor current over the switching period is a simple multiple of a charge for a normal single pulse over a normal switching period for the inductor current.

23. The current controller according to claim 17, wherein the current controller is a light emitting diode (LED) current controller.

24. The current controller according to claim 17, wherein the current controller is implemented in a single integrated circuit.

* * * * *